United States Patent
Nilius

(10) Patent No.: US 9,783,085 B2
(45) Date of Patent: Oct. 10, 2017

(54) SEATING ARRANGEMENT FOR A VEHICLE AND VEHICLE WITH THE SEATING ARRANGEMENT

(71) Applicant: GM GLOBAL TECHNOLOGY OPERATIONS LLC, Detroit, MI (US)

(72) Inventor: Jürgen Nilius, Ginsheim-Gustavsburg (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 44 days.

(21) Appl. No.: 14/927,028

(22) Filed: Oct. 29, 2015

(65) Prior Publication Data
US 2016/0121762 A1    May 5, 2016

(30) Foreign Application Priority Data
Oct. 29, 2014   (DE) .................... 20 2014 008 592 U

(51) Int. Cl.
| | |
|---|---|
| *B60N 2/28* | (2006.01) |
| *B60N 2/58* | (2006.01) |
| *B60N 2/60* | (2006.01) |
| *B60N 2/64* | (2006.01) |

(52) U.S. Cl.
CPC ............. *B60N 2/28* (2013.01); *B60N 2/2887* (2013.01); *B60N 2/5825* (2013.01); *B60N 2/5833* (2013.01); *B60N 2/6009* (2013.01); *B60N 2/64* (2013.01)

(58) Field of Classification Search
CPC ..... B60N 2/2887; B60N 2/289; B60N 2/2893
See application file for complete search history.

(56) References Cited

U.S. PATENT DOCUMENTS

| | | | |
|---|---|---|---|
| 6,234,572 B1 * | 5/2001 | Shiino ................ | B60N 2/286 297/253 |
| 6,254,183 B1 | 7/2001 | Bian et al. | |
| 6,478,376 B2 | 11/2002 | Hayashi et al. | |
| 6,601,917 B1 | 8/2003 | Christopherson | |
| 7,093,896 B2 | 8/2006 | Morita | |
| 7,281,763 B1 * | 10/2007 | Hayashi ............... | B60N 2/2893 297/253 |
| 7,427,103 B2 | 9/2008 | Weber | |

(Continued)

FOREIGN PATENT DOCUMENTS

| | | |
|---|---|---|
| DE | 102006019738 A1 | 10/2007 |
| DE | 102012023773 A1 | 6/2014 |

(Continued)

*Primary Examiner* — Timothy J Brindley
(74) *Attorney, Agent, or Firm* — Lorenz & Kopf LLP

(57) ABSTRACT

A seating arrangement for a vehicle includes abuse cushion and a top cushion. The top cushion is situated on the base cushion and divides the base cushion into a seat cushion section and a coupling cushion section. The seat cushion section is situated in front of the top cushion in the seat direction. The coupling cushion section is situated in back of the top cushion in the seat direction and includes a cover. The seating arrangement includes a coupling device which is configured to cooperate with a child seat having at least one coupling arm for coupling with the coupling device arranged on the seat cushion section. The seating arrangement further includes a guiding device fastened to the cover of the coupling cushion section for the coupling arm.

16 Claims, 4 Drawing Sheets

(56) References Cited

U.S. PATENT DOCUMENTS

| | | |
|---|---|---|
| 8,398,114 B2 | 3/2013 | Laframboise et al. |
| 9,061,619 B2 | 6/2015 | Mantke et al. |
| 2008/0238162 A1 | 10/2008 | Suzuki et al. |
| 2012/0049590 A1 | 3/2012 | Parker |
| 2015/0084388 A1* | 3/2015 | Arai ................... B60N 2/2887 297/250.1 |
| 2016/0144751 A1* | 5/2016 | Asaeda .................. B60N 2/58 297/253 |
| 2016/0144753 A1* | 5/2016 | Del Puerto Camargo ............ B60N 2/2887 297/452.48 |
| 2016/0200224 A1* | 7/2016 | Fujikake ................ B60N 2/289 297/452.38 |
| 2016/0250948 A1* | 9/2016 | Sekino ................ B60N 2/6009 297/452.48 |
| 2016/0325658 A1* | 11/2016 | Hodgson .............. B60N 2/2887 |
| 2017/0001548 A1* | 1/2017 | Iwakata .................. B60N 2/58 |

FOREIGN PATENT DOCUMENTS

| | | |
|---|---|---|
| FR | 822766 A | 1/1938 |
| JP | 2000289505 A | 10/2000 |
| JP | 2001063429 A | 3/2001 |
| JP | 2001277920 A | 10/2001 |
| JP | 2002336091 A | 11/2002 |
| JP | 2006182070 A | 7/2006 |

* cited by examiner

SEATING ARRANGEMENT FOR A VEHICLE AND VEHICLE WITH THE SEATING ARRANGEMENT

CROSS-REFERENCE TO RELATED APPLICATION

This application claims priority to German Patent Application No. 202014008592.7, filed Oct. 29, 2014, which is incorporated herein by reference in its entirety.

TECHNICAL FIELD

The present disclosure pertains to a seating arrangement for a vehicle and a vehicle with the seating arrangement, and more particularly to a seat cushion configuration.

BACKGROUND

In many vehicles, vehicle seats or seat benches are provided with child seat fasteners integrated into the seat cushions. It is here known to provide openings in a seat cushion of the vehicle seat or seat bench, into which a coupling arm of the child seat can be introduced, and which can be fastened in a holding device behind the opening. Also known are openings with guide rails integrated therein, which guide the coupling arm of the child seat to the fastening device. For example, FR 822,766 A1 describes a guide rail, which guides the anchoring arm of a child seat for anchoring purposes. This simplifies installation of the child seat.

SUMMARY

The present disclosure provides a functionally improved seating arrangement for fastening a child seat. Preferred or advantageous embodiments may be gleaned from the present disclosure include the specification, claims and the attached drawing figures. In particular, a seating arrangement for a vehicle, in particular for a passenger car is proposed as a passenger seat or as a seat of a rear seat bench, or as a seat bench, in particular as a front or rear seat bench, of the vehicle.

The seating arrangement includes a base cushion and a top cushion. The top cushion is situated on the base cushion. In this way, the top cushion divides the base cushion into a seat cushion section and a coupling cushion section. The top cushion and coupling cushion section together preferably define a coupling area and/or encompass the latter. The coupling cushion section and, as a supplemental option, the seat cushion section, the top cushion and/or the back cushion include(s) a cover. The cover of the coupling cushion section preferably resembles the cover of the seat cushion section, top cushion and/or back cushion. In this way, the seating arrangement can be given a visually attractive design.

The seat cushion section is preferably designed as a seat shell or as a seat cushion of the base cushion. In particular, a passenger of the vehicle sits down on the seat cushion section with his or her buttocks and/or upper thighs. In particular, the passenger looks in a seat direction while sitting on the seat cushion section. Alternatively, a child seat, in particular for babies, infants and/or children up to twelve years of age, can be arranged on the seat cushion section, in particular set up thereon. The seat cushion section is situated in front of the top cushion in the seat direction. The top cushion preferably includes at least one opening or groove, which is designed to pass through a coupling arm of the child seat that can be arranged on the seat cushion section. The opening is preferably designed as a so-called ISOFIX opening, in particular in accordance with Standard ISO 13216.

The seating arrangement preferably includes a backrest with a back cushion, against which the passenger leans with his or her back while sitting on the seat cushion section. Alternatively, the child seat is supported against the back cushion when arranged and/or set up on the seat cushion section. The top cushion is preferably situated between the base cushion and back cushion. In particular, the top cushion forms an extension, base or pedestal of the back cushion on the base cushion.

The seating arrangement includes a coupling device. The latter is preferably arranged in the coupling area and/or protrudes into the coupling area. In particular, the coupling device is arranged in back of the top cushion and/or coupling cushion section in the seat direction.

The seating arrangement preferably includes the child seat. The latter optionally includes at least one coupling arm for coupling with the coupling device. For example, the coupling arm sticks out of the child seat opposite the seat direction, when the latter is arranged and/or set up on the seat cushion section. The coupling arm preferably extends into the coupling area when the child seat is arranged on the seat cushion section. In particular, the child seat can be coupled by way of the coupling arm with the coupling device to fix and secure the child seat on the seat cushion section with the coupling device. Specifically, the coupling arm can be decoupled from the coupling device, so that the child seat can be removed from the seat cushion section.

The seating arrangement includes a guiding device, which is designed for guiding the coupling arm, in particular into the coupling area, specifically toward the coupling device. The guiding device is attached to the cover of the coupling cushion section. The guiding device is preferably placed on the cover of the coupling cushion section. In particular, the guiding device is positively joined with the cover.

The guiding device ensures a targeted guidance of the coupling arm toward the coupling device. In particular, this enables a simple and quick coupling of the coupling arm with the coupling device. This is advantageous in particular because the coupling area in which the coupling arm is to be coupled with the coupling device is not visible to a user, and this can only be done by touch. The guiding device can advantageously ensure that the user is able to quickly and easily position the child seat and couple it with the seating arrangement.

In an especially preferred embodiment of the present disclosure, the guiding device is sewn to the cover of the coupling cushion section. In particular, the guiding device is sewn onto the cover of the coupling cushion section. As a result, the guiding device can be easily joined with the coupling cushion section and correctly positioned, so as to guide the coupling arm of the child seat toward the coupling device.

For example, the guiding device is designed as a surface component, in particular as a ramp. The guiding device preferably consists of a plastic material. In particular, the guiding device is designed as a plastic ramp. This makes it easy and cost-effective to manufacture the guiding device, thereby enabling the cost-effective and functional manufacture of the seating arrangement.

It is preferred for the guiding device to include a first end and a second end, wherein the second end faces away from the top cushion, and the first end is directed toward the top cushion. For example, the first end is provided with a downward curvature, in particular toward the base cushion, so that, when placed upon and sewn with the guiding device, it protrudes into a fastening area between the seat cushion section and coupling cushion section, and there can be attached, in particular sewn, together with the cover of the coupling cushion section. The second end of the guiding device preferably sticks out of the cover of the coupling cushion section and/or projects upwardly into the coupling area.

In a top view of the guiding device, for example, the second end has a U-shaped design, with a first and second leg sticking out in the lengthwise extension of the guiding device. Situated between the first and second legs in particular is a recess, through which the two legs are arranged spaced apart from each other. The first and second legs preferably include at least one curvature and/or rounded segment in a longitudinal section of the guiding device. For example, it is possible for the first and second leg to be S-shaped in design in the longitudinal section. The curvature and/or rounded segment preferably forms a hook and/or clip to be positively joined with the coupling device. In particular, the first and second leg each include a hook and/or clip to be positively joined with the coupling device.

In a preferred realization of the present disclosure, the second end of the guiding device is positively and/or non-positively joined with the coupling device. In particular, the guiding device is hooked and/or clipped with the first and second leg onto the coupling device. In particular, the first and second leg envelop the coupling device, as a result of which the guiding device is positively and/or non-positively joined with the latter. This ensures that the guiding device is precisely positioned, guides the coupling arm of the child seat toward the coupling device in a targeted manner, and enables a simple coupling. In particular, the recess between the two legs joined with the coupling device produces a window, in which the coupling arm can be unimpededly coupled with the coupling device.

The coupling device is preferably designed as a bracket, for example included of a metal alloy or a plastic material. The coupling device is preferably designed as an ISOFIX bracket, in particular according to Standard ISO 13216. In particular, the coupling device is rigidly secured to the vehicle body inside the vehicle. Alternatively, the coupling device can be fixed to the seating arrangement. As a consequence, the child seat can be securely restrained in the vehicle while coupling the coupling arm with the coupling device.

The seating arrangement preferably includes a protection device, which is designed to protect the guiding device against abrasion. In particular, the protection device protects the guiding device against damage and/or scratching while the coupling arm of the child seat slides over the guiding device and is guided in the direction of the coupling device. For example, the protection device is arranged on an upper side of the guiding device directed toward the coupling area. As an alternative or supplemental option, the protective device covers at least parts and/or sections of the upper side of the guiding device. In particular, the protection device forms a cover layer for the guiding device, on which the coupling arm can be displaced in the direction of the coupling device.

In a preferred embodiment of the present disclosure, the protection device is designed as a surface element consisting of a preferably woven fabric, knitted fabric and/or nonwoven fabric. For example, the protection device takes the form of a carpet. It is preferred that the protection device be adjusted to the outer contour of the guiding device in terms of size and/or shape or approximate the latter. It is also possible for the guiding device to be designed as a strip or rectangle, which is centrally applied to the upper side of the guiding device, in particular in the guiding and/or sliding area of the coupling arm. The protection device can advantageously prevent abrasion to the guiding device, and thereby ensure a durable guidance of the coupling arm toward the coupling device.

It is especially preferred that the protection device be sewn onto the guiding device, in particular onto the upper side. As a supplementary option, the protection device along with the guiding device is sewn onto the cover of the seat cushion section. An identical seam is preferably used for this purpose. As a result, the protection device can be quickly and easily arranged and secured on the guiding device, in particular in the same manufacturing step.

In a preferred embodiment of the present disclosure, the seating arrangement includes a covering device, which is designed to cover the opening of the top cushion. To this end, the covering device can preferably be moved from a covering position, in which it covers the opening, into a releasing position, in which it releases the opening. For example, the covering device can be manually moved by the user from the covering position into the releasing position and back. It is advantageous that the opening can also be covered by the covering device in a visually appealing way when not in use, and if necessary that it can be released as needed for using and passing through the coupling arm.

Within the framework of the present disclosure, it is possible for the covering device to be detachably joined with the base cushion and/or back cushion, and in particular to be removable from the latter as needed.

It is especially preferred within the framework of the present disclosure that the covering device be designed as a flap with an upper and a lower end. The upper end of the flap is preferably fixed to the seating arrangement, in particular to the top cushion and/or to the back cushion and/or permanently joined thereto. As an option, the lower end is detachably joined with the top cushion and/or base cushion, in particular with the seat cushion section. As a consequence, the covering device can be collapsed around the upper end when needed, and the opening for passing through the coupling arm can be released. In particular, the covering device can be moved from the covering position into the releasing position by turning, rolling and/or folding in the lower end and/or collapsing it around the upper end. In the releasing position, the lower end of the covering device can preferably be detachably secured to the top cushion and/or back cushion. Alternatively, the lower end of the covering device can itself be attached to a rear side of the covering device facing the coupling cushion section. As a result, the covering device is stowed in the seating arrangement in the covering position, and can be accessed by the user again at any time.

For example, the covering device includes a textile surface material. The latter preferably resembles the cover of the base cushion, top cushion and/or back cushion in terms of appearance, characteristics and/or composition. As a consequence, the visual design of the seating arrangement is advantageously improved. Due to the flexible, foldable and/or rollable characteristics of the textile surface material, the covering device can be rolled, collapsed and/or folded, so that it can be attached, for example, to the top cushion and/or back cushion in the releasing position in a space-saving manner. Another advantage is that the covering device does not impede the process of arranging and/or setting up the child seat on the seat cushion section when in the releasing position. In addition, the covering device is immediately accessible once again after the child seat has been removed from the seat cushion section, and can be moved back into the covering position.

In a preferred realization of the present disclosure, the seating device includes at least one Velcro strip for attaching the covering device in the covering position and/or releasing position. The Velcro strip preferably includes at least one hook strip section and at least one loop strip section, which interact to yield a positive connection when placed one on top of the other. For example, one of the strip sections is sewn along the lower end and, as a supplementary option, along free lateral areas of the covering device. The other strip section is preferably sewn on the rear side of the covering device, so that the latter can be fastened to itself in the releasing position by being flipped up, rolled in and/or folded. At least one other additional strip section is sewn to the coupling cushion section or seat cushion section, for example, so that the lower end and, as a supplementary option, the free lateral areas can there be fastened in the covering position. Fastening the covering device with at least one Velcro strip is a cost-effective process. In addition, the Velcro strip is easy and self-explanatory to use, making it easy to move the covering device from the covering position to the releasing position and back again.

As an alternative or supplementary option, the seating device includes at least one pushbutton for attaching the covering device in the covering position and/or in the releasing position. At least one pushbutton preferably includes a top part and receiving part, which are held together positively and/or non-positively when the top part is pressed into the receiving part. Optionally, one of the parts of the pushbutton is preferably arranged on the lower end and, as a supplemental option, on the free lateral areas of the covering device, in particular sewn thereto. The other part of the pushbutton is optionally arranged on the seat cushion section, so as to secure the lower end and, as a supplementary option, the free lateral areas there in the covering position. Yet another part of the pushbutton is situated on the rear side of the covering device and/or on the top cushion. As a result, the lower end of the covering device can be easily and reliably fastened in the releasing position, and again detached as needed. In addition, providing the pushbutton is a cost-effective method of attachment.

Another object of the present disclosure relates to a vehicle with the seating arrangement according to one of the preceding claims.

BRIEF DESCRIPTION OF THE DRAWINGS

The present disclosure will hereinafter be described in conjunction with the following drawing figures, wherein like numerals denote like elements.

FIG. 4b is a longitudinal section along the sectional line Y-Y through the guiding device shown in FIG. 4a; and FIG. 4c is a longitudinal section along the sectional line Z-Z through the guiding device shown in FIG. 4a.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
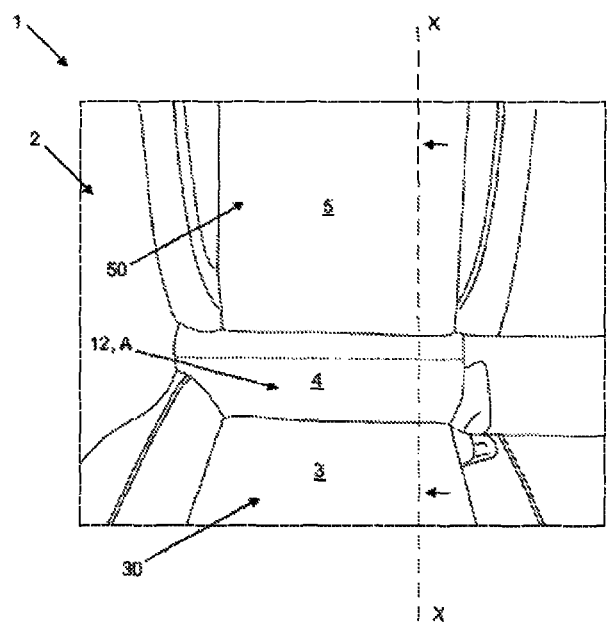
FIG. 1 is a top view from the front of a seating arrangement with a seating device.

FIG. 1 shows a seating arrangement 1 for a vehicle, for example for a passenger car, in a top view from the front. The seating arrangement 1 includes a seating device 2, which is designed as a seat bench, in particular a rear seat bench, of the vehicle. The seating device 2 includes a base cushion 3, a top cushion 4 and a back cushion 5. As depicted on FIG. 2, the top cushion 4 is arranged on the base cushion 3, and divides the latter into a seat cushion section 6 and a coupling cushion section 7. Along with the top cushion 4, the coupling cushion section 7 forms a coupling area 14 and/or at least partially includes the latter. The coupling device 9 is situated in the coupling area 14 and/or protrudes into the latter.

A passenger of the vehicle sits down on the seat cushion section 6 when seated on the rear seat bench. His or her pelvic region rests against the top cushion 4, while his or her back rests against the back cushion 5 when seated on the seating device 2. His or her body and/or gaze is here directed in a seat direction R (FIG. 2).

The top cushion 4 includes a top cushion cover 40 (FIG. 3), and the back cushion 5 includes a back cushion cover 50. The seat cushion section 6 is covered with a seat cushion section cover 60, and the coupling cushion section 7 is covered with a coupling cushion section cover 70. The seat cushion section cover 60 and coupling cushion section cover 70 are attached in a fastening area 18 arranged between the seat cushion section 6 and coupling cushion section 7 via fastening elements 19, and sewn together therein by means of a first seam 20.

Figure 2:
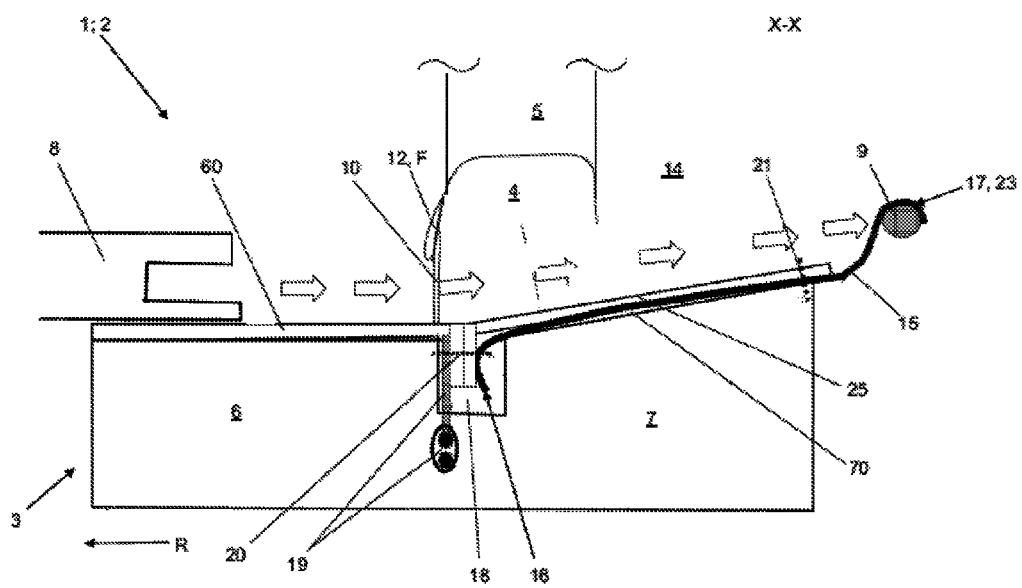
FIG. 2 is a cross section along the sectional line X-X through the seating arrangement from FIG. 1.

In FIG. 2, the seating arrangement 1 from FIG. 1 is depicted in a sectional view, whose sectional line X-X runs perpendicular to a seating surface of the base cushion 3. A child seat can be positioned on the seat cushion section 6, so as to safely transport a child in the vehicle. The child seat includes at least one coupling arm 8 for coupling with a coupling device 9 of the seating arrangement 1. The coupling device 9 is designed as a bracket included of a metal alloy or plastic material. For example, the coupling device 9 involves a so-called ISOFIX bracket, which is standardized in particular according to Standard ISO 13216. The coupling device 9 is fixed in place on the vehicle body, so that the child seat is reliably secured in the vehicle when coupled with the coupling arm 8, and held in its position on the seat cushion section 6 even during a collision of the vehicle.

The top cushion 4 includes a first and second opening 10, 11 (see also FIG. 3), through which the coupling arm 8 of the child seat can be passed for coupling with the coupling device 9. The first and second openings 10, 11 are designed as so-called ISOFIX openings, which are standardized in particular according to Standard ISO 13216. The user guides the coupling arm into the openings 10, 11 opposite the seat direction R, and continues to push it until it becomes coupled with the coupling device 9.

Figure 4A:
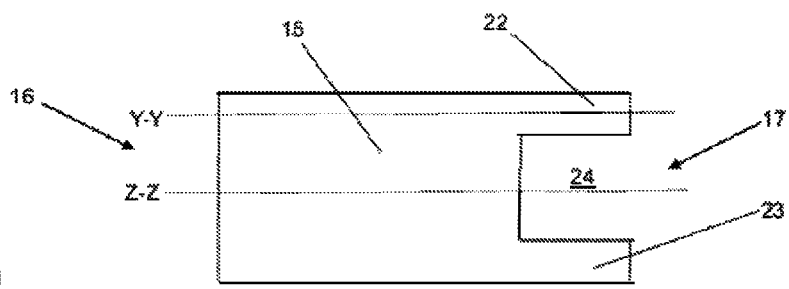
FIG. 4a is a top view from above on a guiding device of the seating arrangement shown in FIG. 1.
Figure 4B:
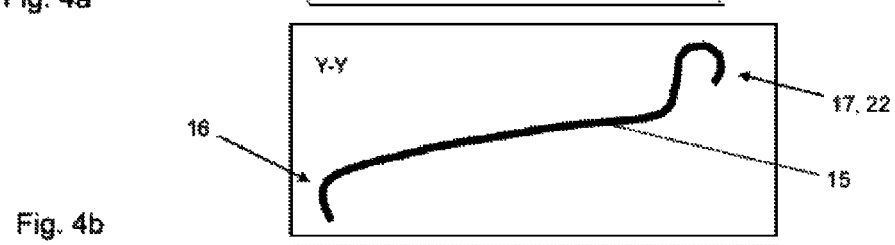
Figure 4C:
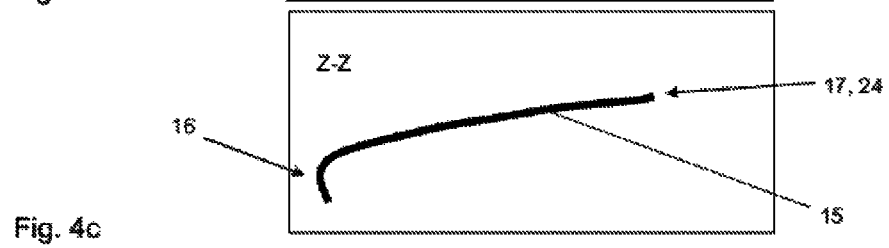

The seating arrangement 1 includes a guiding device 15 for guiding the coupling arm 8 on the coupling cushion section 7 and/or in the coupling cushion area 14 in the direction of the coupling device 9. The guiding device 15 is shown on FIG. 4a in a top view of an upper side, and on FIG. 4b in a sectional view along sectional line Y-Y from FIG. 4a, and on FIG. 4c in a sectional view along sectional line Z-Z from FIG. 4a.

The guiding device 15 is designed as a surface component, preferably as a ramp included of a plastic material. It includes a first end 16 and a second end 17. The first end 16 includes a curvature and/or rounded segment in the longitudinal section according to FIGS. 4b, 4c that is downwardly directed in the image plane, so that it protrudes into the fastening area 18 when situated on the coupling area section cover 70, and can there be fastened. The second end 17 is U-shaped in design in the top view according to FIG. 4a, so that the latter consists of two legs 22, 23 that stick out in a lengthwise extension, which are spaced apart from each other by a recess 24. In the longitudinal section according to FIG. 4b, the legs 22, 23 are bent once or twice, in particular designed as a hook or shaped like an S. As a result, the legs 22, 23 can be hooked into the coupling device 9 or clipped onto the latter.

As depicted on FIG. 2, the guiding device 15 is placed onto the coupling cushion section cover 70 and fastened thereto. In particular, the guiding device 15 is sewn onto the coupling cushion section cover 70 or sewn with the latter. The first end 16 of the guiding device 15 protrudes into the fastening area 18, and is there sewn with the coupling cushion section cover 70 and, as a supplemental option, with the seat cushion section cover 60 and fastening device 19 by means of the first seam 20. To ensure a secure hold, the guiding device 15 is sewn onto the coupling cushion section cover 70 with a second seam 21.

The second end 17 of the guiding device 15 protrudes into the coupling area 14. The guiding device 15 is joined with the coupling device 9 via the legs 22, 23 of the second end 17. To this end, the legs 22, 23 envelop the coupling device 9, thereby yielding a positive connection in and opposite the seat direction R. In particular, the legs 22, 23 are clipped onto the coupling device 9 or hooked thereon. This results in a ramp leading to the coupling device 9 for the coupling arm 8. When introducing the coupling arm 8 through the opening 10, 11, the guiding device 15 makes it easier to shift the coupling arm 8 in the direction of the coupling device 9, and facilitates the reciprocal coupling. The recess 24 between the legs 22, 23 enables an unimpeded coupling of the coupling arm 8 with the coupling device 9, since it forms a window in which the coupling device 9 remains uncovered and/or exposed for coupling the guiding device 15.

The seating arrangement 1 includes a protection device 25 for the guiding device 15. The protection device 25 is designed as a textile surface material, in particular as a woven, knitted or nonwoven fabric. For example, the protection device takes the form of a carpet. The protection device 25 is arranged on the guiding device 15, and covers at least parts and/or sections of the latter. As a result, the guiding device 15 is protected against abrasion by the coupling arm 8 when the user pushes the latter toward the coupling device 9. The protection device 25 along with the guiding device 15 is sewn onto the coupling cushion section cover 70 by means of the first and second seams 20, 21. As a result, the protection device 25 can be easily and quickly fastened to the coupling cushion section cover 70, in particular in a combined operation with the guiding device 15. This makes it possible to save on production costs and working time.

Figure 3:
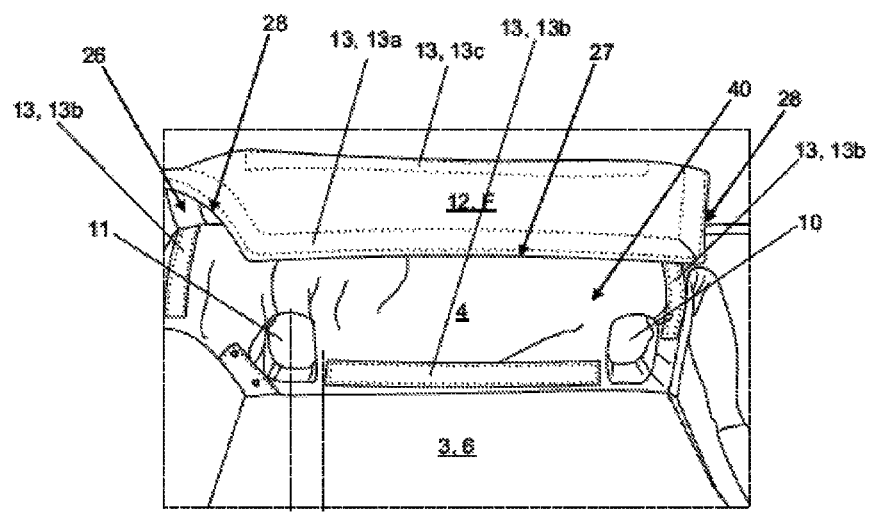
FIG. 3 is a top view from the front of a top cushion of the seating device shown in FIG. 1 with a covering device in a releasing position.

FIG. 3 presents a top view from the front of the top cushion 4 of the seating device 2. The seating device 2 includes a covering device 12 for covering the first and second openings 10, 11 of the top cushion 4. The covering device 12 can be moved from a covering position A, in which it covers the first and second openings 10, 11 of the top cushion 4, into a releasing position F, in which it releases the first and second openings 10, 11. FIG. 1 depicts the covering device 12 in the covering position A, and FIG. 3 in the releasing position F.

The covering device 12 is designed as a flap made out a flexible, textile material that can be rolled up, collapsed and/or folded. In particular for reasons of visual appearance, the textile material resembles the seat cushion section cover 60 and/or back cushion cover 50. The covering device 12 includes an upper end 26 directed toward the back cushion, and a lower end 27 directed toward the base cushion 3 in the covering position A. The upper end 26 of the covering device is fastened to the seating device 2, in particular to the top cushion 4 and/or the back cushion 5. In particular, the upper end 26 is sewn with the top cushion cover 40 and/or the back cushion cover 50 (FIG. 1). The lower end 27 can be detachably joined with the top cushion cover 40. To this end, the seating device 2 includes a Velcro strip 13 with a hook strip section 13a and a first and second loop strip section 13b, 13c.

The hook strip section 13a is sewn onto the rear side of the covering device 12, and extends along the lower end 27 and along the lateral areas 28 of the covering device 12. The first loop strip section 13b is sewn into the corresponding areas of the top cushion cover 40 as a counter-piece, so that the lower end 27 of the covering device 12 can be fastened by the Velcro to the top cushion cover 40, and held in the covering position A.

The second loop strip section 13c is centrally sewn onto the rear side of the covering device 12 as a counter-piece. It serves to fasten the covering device 12 in the releasing position F. In order to be moved into the releasing position F, the Velcro connection with the first loop strip section 13b is dissolved, and the lower end 27 is at least partially collapsed, folded and/or rolled up toward the rear side and fastened by the Velcro with the second loop strip section 13b.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A seating arrangement for a vehicle comprising:
    a seating device including a base cushion and a top cushion situated on the base cushion and dividing the base cushion into a seat cushion section and a coupling cushion section having a cover, wherein the seat cushion section is situated in front of the top cushion in a seat direction and the coupling cushion section is situated in back of the top cushion in the seat direction;
    a coupling device arranged in a coupling area and configured to couple with at least one coupling arm of a child seat; and a guiding device fastened to the cover of the coupling cushion section and configured to guide the coupling arm of the child seat, the guiding device including a first end and a second end, which in a top view includes a U-shaped design having first and second legs extending out in the lengthwise extension of the guiding device and a recess situated between the first and second legs.

2. The seating arrangement according to claim 1, wherein the guiding device is sewn to the cover of the coupling cushion section.

3. The seating arrangement according to claim 1, wherein the guiding device comprises a ramp for the coupling arm that leads to the coupling device.

4. The seating arrangement according to claim 1, wherein the first and second legs include a fastening element to be positively joined with the coupling device.

5. The seating arrangement according to claim 4, wherein the fastening element is selected from the group consisting of a clip and a hook.

6. The seating arrangement according to claim 4, wherein the guiding device is fastened onto the coupling device with the first and second legs, wherein the recess produces a window for coupling the coupling arm with the coupling device.

7. The seating arrangement according to claim 1, wherein the top cushion comprises at least one opening configured to allow the coupling arm to pass through the opening, and a covering element configured to cover the opening and movable from a covering position in which it covers the opening, into a revealing position in which it exposes the opening.

8. The seating arrangement according to claim 7, wherein the covering device is designed as a flap with an upper end fixed to the seating device, and a lower end that can be inwardly positioned to move the covering device from the covering position into the revealing position.

9. The seating arrangement according to claim 7, wherein the covering device comprises a flexible textile surface material.

10. The seating arrangement according to claim 7, wherein the seating device comprises at least one hook strip and at least one loop strip for attaching the covering device in at least one of the covering position and the revealing position.

11. The seating arrangement according to claim 7, wherein the seating device comprises at least one pushbutton for attaching the covering device in at least one of the covering position and the revealing position.

12. A vehicle with the seating arrangement according to claim 1.

13. A seating arrangement for a vehicle comprising:
a seating device including a base cushion and a top cushion situated on the base cushion and dividing the base cushion into a seat cushion section and a coupling cushion section having a cover, wherein the seat cushion section is situated in front of the top cushion in a seat direction and the coupling cushion section is situated in back of the top cushion in the seat direction;
a coupling device arranged on the coupling cushion section and configured to couple with at least one coupling arm of a child seat;
a guiding device fastened to the cover of the coupling cushion section and configured to guide the coupling arm of the child seat; and
a protection device against abrasion to the guiding device.

14. The seating arrangement according to claim 13, wherein the protection device comprises a surface element selected from the group consisting of a woven fabric, a knitted fabric and a nonwoven fabric.

15. The seating arrangement according to claim 13, wherein the protection device is sewn onto the guiding device.

16. The seating arrangement according to claim 13, wherein the protection device is sewn along with the guiding device onto the cover of the coupling cushion section.

* * * * *